United States Patent [19]

Peterson

[11] 4,152,381

[45] May 1, 1979

[54] METHOD FOR PREPARING METALLATED FILAMENT-WOUND STRUCTURES

[75] Inventor: George R. Peterson, Knoxville, Tenn.

[73] Assignee: The United States of America as represented by the United States Department of Energy, Washington, D.C.

[21] Appl. No.: 751,623

[22] Filed: Dec. 17, 1976

[51] Int. Cl.$^2$ .............................................. C04B 35/56
[52] U.S. Cl. .................................... 264/29.5; 106/43; 264/60; 264/63; 264/134; 264/325
[58] Field of Search ................... 264/60, 332, 63, 134, 264/DIG. 19, 325, 29.5; 106/43

[56] References Cited

U.S. PATENT DOCUMENTS

| 3,644,135 | 2/1972 | Speyer et al. | 264/60 |
| 3,712,428 | 1/1973 | Marin | 264/60 |
| 3,766,000 | 10/1973 | Gibson et al. | 264/60 |
| 3,796,564 | 3/1974 | Taylor et al. | 264/63 |

FOREIGN PATENT DOCUMENTS 1201654  8/1970  United Kingdom ..................... 264/60

OTHER PUBLICATIONS

Roshid et al., "Development of Carbide Coatings for Graphite Filaments," *Cer. Bull.*, vol. 51, No. 11 (1972), pp. 836–839.

*Primary Examiner*—Robert F. White
*Assistant Examiner*—John A. Parrish
*Attorney, Agent, or Firm*—Dean E. Carlson; Stephen D. Hamel; Earl L. Larcher

[57] ABSTRACT

Metallated graphite filament-wound structures are prepared by coating a continuous multi-filament carbon yarn with a metal carbide, impregnating the carbide coated yarn with a polymerizable carbon precursor, winding the resulting filament about a mandrel, partially curing the impregnation in air, subjecting the wound composite to heat and pressure to cure the carbon precursor, and thereafter heating the composite in a sizing die at a pressure loading of at least 1000 psi for graphitizing the carbonaceous material in the composite. The carbide in the composite coalesces into rod-like shapes which are disposed in an end-to-end relationship parallel with the filaments to provide resistance to erosion in abrasive laden atmospheres.

5 Claims, 1 Drawing Figure

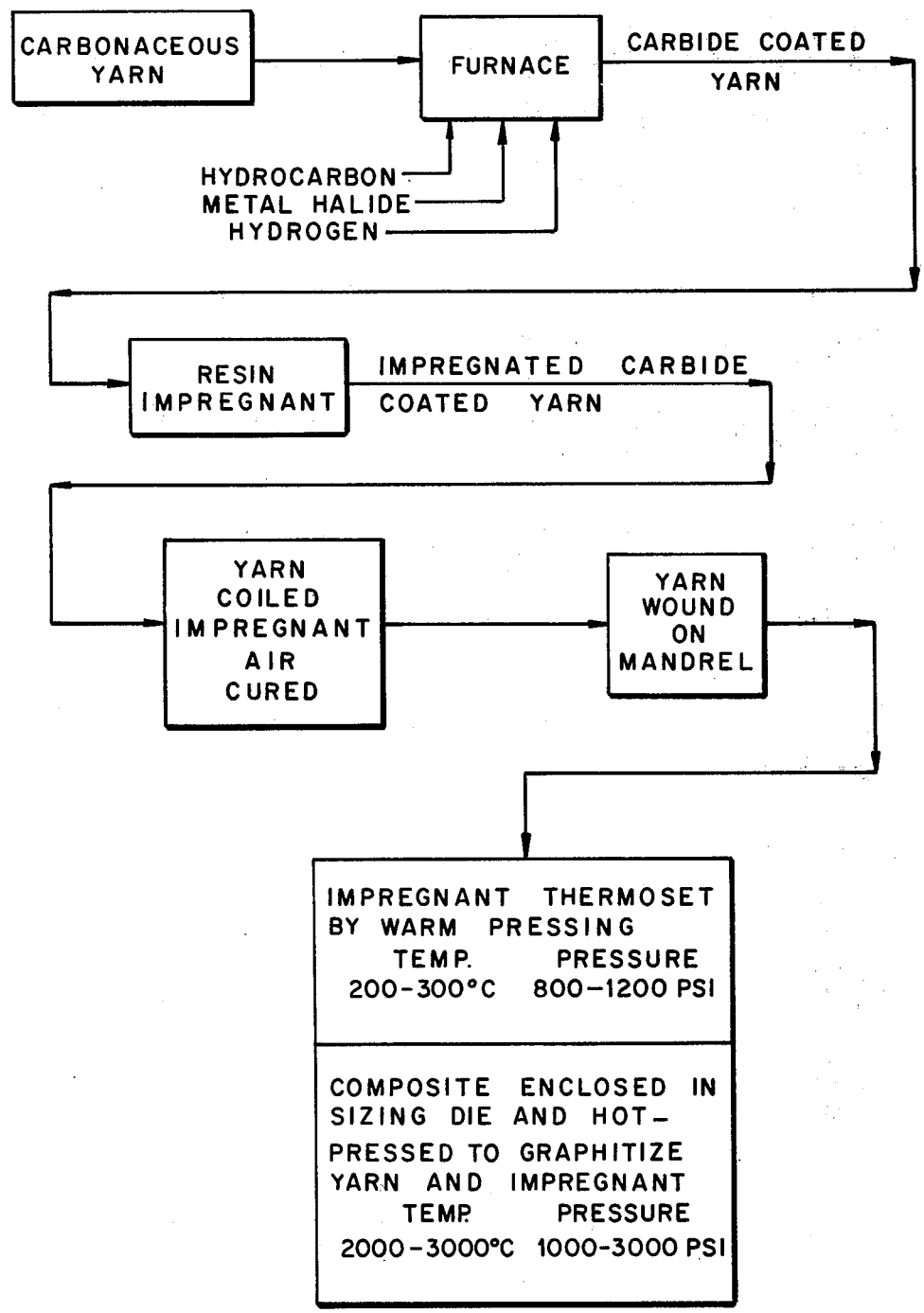

METHOD FOR PREPARING METALLATED FILAMENT-WOUND STRUCTURES

This invention was made in the course of, or under, a contract with the United States Energy Research and Development Administration.

The present invention relates generally to the fabrication of metallated filament-wound composites, and more particularly to a method for preparing graphitized filament-wound composites in which metal carbides are incorporated in a uni-directional arrangement parallel with the wound filament.

High-temperature applications such as space reentry vehicles, rocket nozzles, combustion chamber liners, heat shields, and the like require the use of structural materials which exhibit high temperature strength, resistance to thermal shock, and good resistance to erosion and ablation. Considerable success has been achieved in this area by employing carbonaceous filament-wound structures. The use of carbonaceous filaments, i.e., carbon or graphite, has proven to be particularly desirable since these filaments are sufficiently light and flexible to permit the formation of structures of various configurations and are useful at high temperatures because of their strength improvement as the temperature increases. However, one of the problems frequently encountered in abrasive environments where ablation properties are desired is the erosion suffered by the filament-wound structure due to contact with dust particulates and other abrasives in the environment. The erosion resistance of the composite has been improved by incorporating carbides and other metallic materials in the composite. However, while the incorporation of the carbides and other metallic particulates tend to increase resistance to erosion there were still some shortcomings in that the carbides tended to migrate during the formation of the composite away from the point of best use and were not properly oriented with respect to the fiber orientations so as to sufficiently reduce the erosion of the fibers and matrix by the abrasive particulates.

Accordingly, it is the primary aim or goal of the present invention to provide a metallated filament-wound structure wherein the metal incorporated therein is in a particular orientation with respect to the filament orientation so as to substantially minimize the erosion of the composite when contacted by dust and other airborne abrasive particulates. Generally, the metallated fiber composite of the present invention is prepared by the steps of providing a continuous carbonaceous yarn, i.e., graphite or carbon, composed of a multiple number of loosely wound filaments with a carbide coating, passing the carbide coated filament through a bath of a carbonizable resin precursor, air curing the resin precursor, winding the yarn under tension onto a mandrel of the desired product configuration, heating the composite under pressure to further cure the resin precursor, placing the composite in a sizing die, and thereafter heating the composite under pressure for graphitizing the carbonaceous components of the composite. The application of the pressure loadings on the composite during the resin curing and the graphitizing steps was found to be instrumental in obtaining the microscopic structural alignment of the carbide with respect to the orientation of the fibers in that the metal carbide coalesces in the form of rod-like pieces disposed in line contiguous to and parallel with the yarn filaments. With these metal carbides rods exposed in an end-on position with the filaments, the ablation type applications especially in abrasive atmospheres required for the composite are greatly enhanced.

Other and further objects of the invention will be obvious upon an understanding of the illustrative method about to be described or will be indicated in the appended claims, and various advantages not referred to herein will occur to one skilled in the art upon employment of the invention in practice.

A flow diagram has been chosen for the purpose of facilitating the description of the method of the present invention. The illustration is not intended to be exhaustive or to limit the invention to the precise steps disclosed. It is chosen and described in order to best explain the principles of the invention and their application in practical use to thereby enable others skilled in the art to best utilize the method in various steps and modifications of such steps as are best adapted to the particular use contemplated.

In the accompanying drawing:

The FIGURE is a schematic illustration showing a flow diagram of the filament material as it progresses through the various treating, winding, and heating steps to the final composite.

With reference to the accompanying drawing, the present invention is directed to a method for fabricating a carbide-containing graphite filament graphite-matrix composite which is particularly useful in applications where such properties as thermal shock resistance, uniform low rate ablation, and high resistance to moisture and airborne particulate erosion are essential characteristics. Generally, the method comprises coating a continuous carbon or graphite yarn formed of a plurality of loosely wound monofilaments with a metal carbide and then impregnating the carbide coated yarn with a carbonizable resin precursor. This resin-impregnated yarn is then recoiled and the resin precursor allowed to partially cure in air at room temperature so as to increase the strength of the yarn for facilitating the winding of the latter about a mandrel, preferably in such a pattern that the plane in which the yarn lies is parallel to the direction or plane from which abrasion or ablation occurs. After the yarn is wound on a mandrel with a suitable number of layers, it is heated under pressure in an inert atmosphere of argon or nitrogen to polymerize or thermoset the resin to a more solid state than the aforementioned air cure. The composite is then placed within a sizing die and subjected to several cycles of heating under a pressure loading in argon or nitrogen so as to graphitize the resin and the yarn if the yarn is not already in a graphite form. The application of the pressure loading upon the composite during the thermosetting of the resin and the graphitizing steps provides a microscopic structural rearrangement of the carbide coating in that the carbide coating coalesces to form discrete rod-like bodies which are disposed between contiguous graphite filaments. These rod-like bodies are in a size range of 0.25 $\mu$m to 0.51 $\mu$m in diameter. The carbide rods are disposed in planes parallel with the filaments so as to provide an end-on position for leading edge type applications so as to substantially reduce the affects of ablation and abrasion upon the overall composite. Also by employing the pressure loadings during the resin thermosetting and graphitizing steps the contiguously disposed graphite filament were found to be bonded securely together by the graphitized resin. The matrix forming resin is in a concentration of less than about 1 weight percent. This relatively small quantity of matrix material results in a structure consisting virtually entirely of the graphite filaments and carbide rods and characterized by fine pores and less than about 7.5% porosity since the size of the pores in the wound composite are substantially reduced by the increase in filament density caused by the application of the pressure loadings. Also, each monofilamet in the filament is reduced in size and densified or the monofilament density is increased.

The carbonaceous yarn as used in the present method may be a yarn which has already been graphitized prior to coating with the metal carbide or a carbon yarn which has been carbonized by being heated to a carbonizing temperature below a graphitizing temperature. The carbonaceous yarn suitable for use in the method of the present invention includes carbon and graphite yarns produced from polymeric fibrous material such as polyacrylnitrile, polyvinyl alcohol, and natural or regenerated cellulose. The carbonaceous yarn is in a continuous form and of a single ply with 600 to 10,000 filaments in the ply. The yarn is preferably loosely wound with about 2 to 3 turns per inch so that it may be wound about the mandrel in a relatively flat ribbon-like configuration under tension as will be described in greater detail below.

The carbide coating on the yarn may be provided by employing a vapor deposition procedure wherein a carbide forming metal is a refractory metal halide in the form of a chloride, bromide or iodide with a metal such as titanium, tantalum, molybdenum, tungsten, vanadium, hafnium, zirconium, niobium, and the like. The carbide coating may be placed on the yarn by passing the yarn through an elongated furnace at atmospheric pressure and at a temperature in the range of 900°–1200° C. The metal halide is introduced into the furnace together with hydrogen and a hydrocarbon gas such as methane, $C_2H_2$, $C_2H_4$, or benzene. At the furnace temperature, the halide is thermally decomposed and then interreacts with the hydrocarbon gas in the presence of hydrogen with the decomposition products settling upon the carbon yarn to form a carbide coating. A carbide coating of a thickness in the range of about 600 to 1200 angstroms is sufficient for practicing the method of the present invention. Further details relating to the technique suitable for providing the carbide coating on the yarn are set forth in assignee's U.S. Pat. No. 3,781,173 which issued Dec. 25, 1973 in the name of John M. Napier et al.

After coating the carbonaceous yarn with the metal carbide the yarn is then infiltrated or impregnated with a carbonizable resin precursor. This impregnation step may be achieved by passing the carbide coated yarn through a bath containing the resin precusor. The resin precursors usable in the method of the present invention are preferably thermosetting resins such as phenolics, epoxys, partially polymerized furfuryl alcohols, and the like. These resin precursors provide a carbonizable binder for binding together adjacent carbide coated carbonaceous filaments during the graphitization of the binder and yarn. Also, the particular resins employed provide a high coking factor, i.e., a high percentage of graphite yield, when subjected to process temperatures in a temperature range described below. Normally, the quantity of the resin precursor necessary for the practice of the present invention is in the order of about 0.1 to 1.0 percent since with the warm and hot pressing steps employed in the practice of the present invention this relatively small percentage of resin precursor provides an adequate bonding between contiguously disposed filaments. The bath containing the carbonizable resin precursor is preferably diluted with a solvent which is readily volatilized at temperatures substantially lower than the process temperatures used for carbonizing the resin precursor. Satisfactory results may be obtained by using solvents such as acetone or methyl isobutyl ketone for the resins employed. Also a quantity of about 5 to 6 weight percent camphor is added to the impregnating bath for the purpose of wetting the yarn to improve dispersion of the resin precursor.

As the yarn is withdrawn from the resin impregnating bath it is preferably respooled prior to the winding operation for partially curing the resin precursor in air for approximately 2 to 4 hours at room temperature. This step of air curing the resin precursor evaporates most of the dilution solvents from the impregnant and provides sufficient strength to the filaments so as to permit the yarn to be wound about a mandrel under a tension loading which otherwise could not be used.

After air curing the resin, the impregnated yarn is wound under tension about the mandrel of the desired product configuration with the loosely twisted yarn spreading into an almost flat ribbon-like configuration on a mandrel. A tension loading of about 500 to 700 grams on the yarn provides a closely wound structure with minimal interstices between adjacent filaments.

Upon completion of the winding operation, the resin precursor is then thermoset by subjecting the yarn on the mandrel to a pressure loading in the range of about 800 to 1200 psi and a temperature in the range of about 200° to 300° C. for a duration of about 16 to 20 hours. This warm pressing operation may be accomplished by heating the wound structure in a closed graphite die mounted in an electrically heated hydraulic press wherein the pressure and temperature can be accurately controlled.

The resulting warm-pressed composite is then hot pressed at higher temperatures in a sizing die assembly of graphite or other suitable material by employing a multiple cycle operation. Satisfactory results have been achieved by heating the die-enclosed composite at a temperature in the range of about 2000° to 3000° C. at a temperature in the range of about 1000 to 2000 psi. The hot pressing of the composite may be achieved in any suitable manner such as by induction heating in a graphite die mounted in a hydraulic press provided with pressure and temperature controls. Preferably a three-step cycle is used for the hot pressing operation wherein the composite is first hot pressed from room temperature to 2000° C. in a period of about 3 to 4 hours at a pressure loading of 1000 psi, then heating the composite from 2000° to 3000° in about 3 to 4 hours while under a pressure loading of 2000 psi. This latter temperature and pressure is then maintained on the composite for a period of about 15 to 60 minutes. The resulting structure is a graphite structure with the graphitized resin providing a tenacious bond between the contiguously disposed graphite filaments. The density of the hot pressed composite is increased from about 1.4 g/cc to 2.19 g/cc during the graphitization cycle while the composite thickness is reduced about 34% by the hot pressing operation. The metal carbide incorporated in the composite coalesces during the hot pressing cycle to form long slender rods lined end-to-end with one another and lying parallel to the graphite filaments. The arrangement of the rods provide the composite with significant resistance to abrasion and ablation when subjected to abrasive and ablative environments.

In order to more clearly understand the method of the present invention an example relating to a typical fabrication of a leading edge structure is set forth below.

EXAMPLE

A flat graphite mandrel was covered with a layer of flaked graphite foil and coupled to a rotatable spindle for the winding operation. A continuous single ply carbon yarn containing 720 monofilaments loosely twisted together with about 3 turns per inch was coated with tantalum carbide by chemical vapor deposition. The average coating thickness was about 900 angstroms. The carbide coated yarn was then passed through an impregnating solution formed of 70% wt. % partially polymerized furfuryl alcohol, 24% furfuryl alcohol monomer, and 6 wt. % camphor, and 400 milliliters of acetone. The metal carbide coated yarn was then respooled and the impregnant cured in air at room temperature for 4 hours. The prepregged yarn containing 20 weight percent tantalum carbide was then guided from the spool and fastened to the mandrel and wound with a tension of 600 grams in a side-by-side arrangement. The wound composite was then heated at 250° in an inert atmosphere of nitrogen under a pressure of 1000 psi over a 16 hour period to thermoset the resin impregnant. The composite was then hot pressed and graphitized in a graphite die assembly with a three step cycle consisting of heating the composite in nitrogen from room temperature to 2000° C. in 2 hours at a 1000 psi loading. The second heating under pressure was from 2000° to 3000° C. in 3 hours under a pressure loading of 2000 psi. The third cycle consisted of holding the latter temperature and pressure for a period of thirty minutes.

The physical properties of the graphitized composite was a density of 2.19 g/cc with a porosity of 7.37 percent and with 100 percent of the pores being of a size less than 1.2 micrometers. The tantalum carbide content of the resulting composite was 15.4 weight percent with the carbide rods disposed along the length of the contiguously disposed filaments. These rods were in the range of about 0.2 to 0.5 microns in diameter.

As various changes may be made in the form and arrangement of the method steps herein without departing from the spirit and scope of the invention and without sacrificing any of its advantages, it is to be understood that all matter herein is to be interpreted as illustrative and not in a limiting sense.

What we claimed is:

1. A method for preparing an erosion resistant filament wound graphite structure wherein rod-like pieces of a refractory metal carbide are disposed in the graphite structure in an end-to-end relationship in a plane parallel to and contiguous with the filaments forming the winding, comprising the steps of providing a continuous carbonaceous yarn with a coating of a refractory metal carbide, impregnating the yarn with a thermosetting carbonizable resin precursor, partially curing the resin precursor in the yarn in air at room temperature prior to winding the yarn on a mandrel, winding the impregnated yarn about a mandrel of the desired product configuration, warm pressing the wound composite at a temperature in the range of 200° to 300° C. at a pressure of 800 to 1200 psi, enclosing the resulting composite in a sizing die, and hot pressing the composite at a temperature in the range of 2000° to 3000° C. and a pressure in the range of 1000 to 2000 psi to graphitize the graphitizable components in the composite, said warm pressing and hot pressing steps effecting the coalescence of the refractory metal carbide coating for forming said rod-like pieces of the refractory metal carbide.

2. The method for preparing an erosion resistant filament wound graphite structure as claimed in claim 1, including the additional step of applying a tension loading of 500 to 700 grams on the yarn during the winding of the yarn on the mandrel.

3. The method for preparing an erosion resistant filament wound graphite structure as claimed in claim 2, wherein the carbonaceous yarn is singly ply with 600 to 10,000 filaments in the ply with the filaments wound to form the yarn with about 2 to 3 turns per inch of length, and wherein the tension loading on the yarn provides a relatively flat ribbon-like wrap on the mandrel.

4. The method for preparing an erosion resistant filament wound graphite structure as claimed in claim 1, wherein the hot pressing of the composite is provided by a three-step cycle consisting of heating the composite to a temperature of about 2000° C. and a pressure loading of about 1000 psi for a duration of about 3 to 4 hours, heating the composite from about 2000° to 3000° C. at a pressure loading of about 2000 psi over a duration of about 3 to 4 hours, and maintaining the about 3000° C. temperature and the about 2000 psi pressure loading for a duration of 15 to 60 minutes.

5. The method for preparing an erosion resistant filament wound graphite composite as claimed in claim 1, wherein the carbonizable resin precursor comprises partially polymerized furfuryl alcohol and up to about 6 weight percent camphor.

* * * * *